United States Patent [19]

Kuribayashi et al.

[11] 4,253,126
[45] Feb. 24, 1981

[54] LINEAR TRACKING ARM ASSEMBLY

[75] Inventors: Hiroshi Kuribayashi; Juniti Ohnishi, both of Tokorozawa, Japan

[73] Assignee: Pioneer Electronic Corporation, Tokyo, Japan

[21] Appl. No.: 964,781

[22] Filed: Nov. 28, 1978

[30] Foreign Application Priority Data

Nov. 28, 1977 [JP] Japan ................. 52-142400
Apr. 28, 1978 [JP] Japan ................. 53-51452

[51] Int. Cl.³ .................. G11B 21/10; G11B 5/58; G11B 17/00
[52] U.S. Cl. .................. 360/107; 310/13; 360/77; 360/97
[58] Field of Search .......... 360/107, 106, 105, 97–99, 360/86; 318/653, 135; 310/12–14

[56] References Cited

U.S. PATENT DOCUMENTS

| | | | |
|---|---|---|---|
| B 483,247 | 4/1976 | Schneider | 310/13 |
| 3,576,454 | 4/1971 | Beach, Jr. et al. | 310/12 |
| 3,702,997 | 11/1972 | Jamelson | 360/105 |
| 3,713,121 | 1/1973 | Fasano et al. | 360/105 |
| 3,886,595 | 5/1975 | Swaim et al. | 360/106 |
| 3,906,326 | 9/1975 | Chur | 360/106 |
| 3,917,987 | 11/1975 | Inoue | 310/13 |
| 3,961,371 | 6/1976 | Kobylarz et al. | 360/107 |
| 3,983,318 | 9/1976 | Miller et al. | 310/13 |
| 4,075,517 | 2/1978 | Adler | 360/106 |

*Primary Examiner*—Alfred H. Eddleman
*Attorney, Agent, or Firm*—Michael J. Striker

[57] ABSTRACT

A linear tracking arm assembly for linearly tracking a recording medium such as an audio or video disc, in which a tracking arm is linearly moved by means of an electric linear motor assembly.

17 Claims, 4 Drawing Figures

LINEAR TRACKING ARM ASSEMBLY

FIELD OF THE INVENTION

The present invention relates to a tracking arm assembly for use with an audio disc player, a video disc player or the like and, more particularly, to a linear tracking arm assembly in which a pick-up arm linearly moves to trace a track formed on a recording medium such as an audio or video disc placed on a turn-table or the like.

BACKGROUND OF THE INVENTION

A linear tracking arm assembly comprises a pick-up arm for detecting information recorded on a track of a recording medium mounted on drive means such as a turn-table, and a conveyer mechanism for linearly conveying the pick-up arm along the recording medium, so that the pick-up arm traces the track of the recording medium while linearly moving.

The conveyer mechanism in the conventional linear tracking arm assembly is usually driven by a rotary electric motor the rotation of which is transferred through a reduction gearing to a converter for converting the rotational movement to a linear movement. A worm gear assembly has been in some cases used for such converter.

However, it has been a problem that the rotary motor produces unwanted shocks and vibrations which cause degradation of S/N ratio in reproduced information. Furthermore, a large capacity of electric source for energizing the rotary motor is required which is subjected to produce ripple components in other circuits, thereby inviting degradation of S/N ratio in reproduced signals. In addition, a servo mechanism must be provided for performing constant rotation of the rotary motor. Such servo mechanism causes the overall assembly to be complex in construction and large in dimention and furthermore raises the total cost of the assembly.

Accordingly, it is a primary object of the present invention to provide a linear tracking arm assembly which is simple in construction and free from such degradation of S/N ratio in reproduction as mentioned above.

It is another object of the present invention to provide a linear tracking assembly which is stable in operation.

It is still another object of the present invention to provide a linear tracking assembly which is free from unwanted overshoots in response.

Other objects and advantages of the present invention will become apparent to those skilled in the art from a consideration of the following detailed description of illustrative embodiments of the invention, had in conjunction with the accompanying drawings in which like numerals refer to like or corresponding parts.

DESCRIPTION OF THE PREFERRED EMBODIMENTS

Briefly described, a linear tracking arm assembly according to the present invention comprises a conveying mechanism for linearly conveying a pick-up arm which mechanism is driven by an electric linear motor assembly formed therein.

Figure 1:
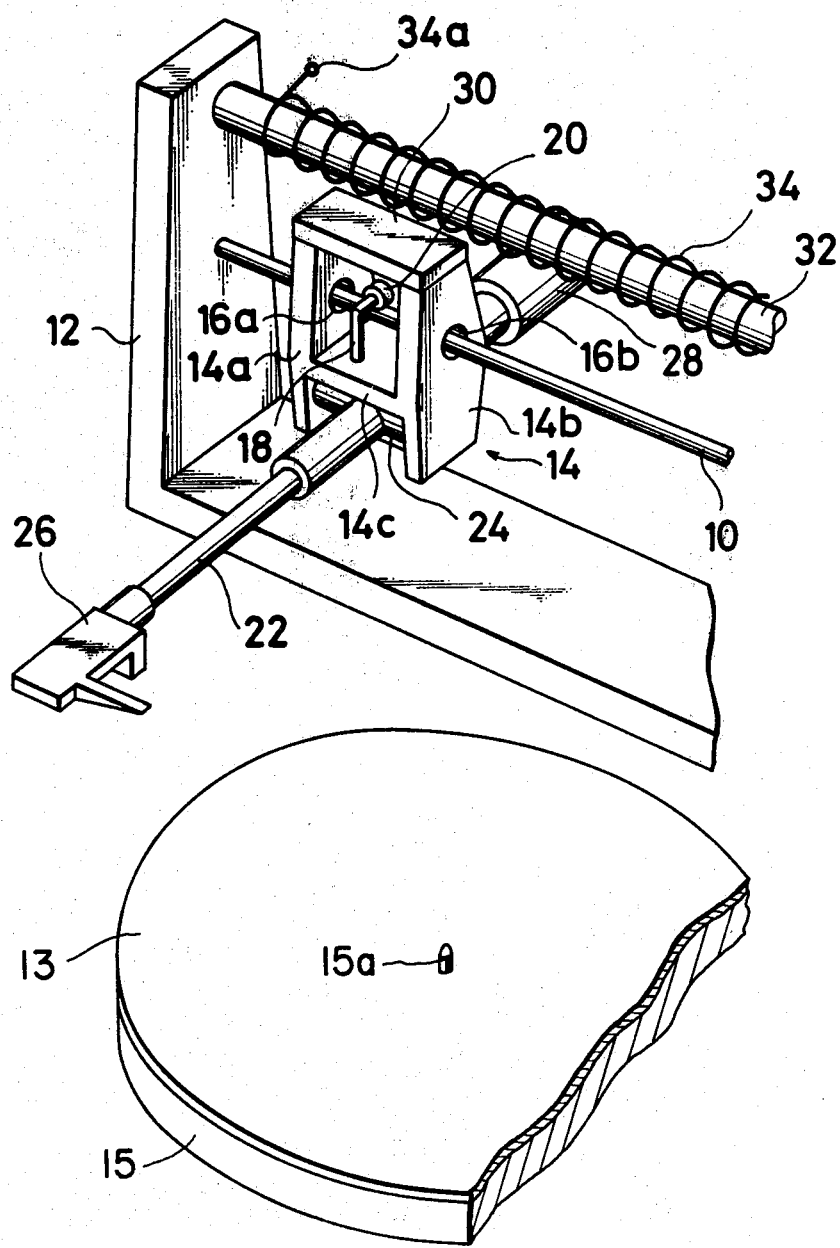
FIG. 1 is a fragmentary perspective view of an embodiment of the present invention.

Referring to FIG. 1, there is shown a preferred embodiment of the present invention which comprises a guide bar or rail 10 which is supported by a support block 12 so that the guide rail 10 extends along or is coextensive with a recording medium such as a recording disc 13 which is mounted on a recording medium drive means such as a turn-table 15 having a spindle 15a.

A support body 14 is carried on the guide rail 10 so that the support body 14 can smoothly move on the guide rail 10. The support body 14 is, in this case, constituted by a pair of side portions 14a and 14b respectively having bores 16a and 16b loosely coupled with the rail 10 an a central portion 14c connecting the side portions 14a and 14b. An L-shaped rod 18 stands from the upper surface of the central portion 14c. On a top end of the L-shaped rod 18 is rotatably mounted a roller 20 which is engaged on the guide rail 10 so that the support body 14 is movable along the guide rail 10. A pick-up arm 22 is mounted on a mechanical arrangement such as a rod 24 provided at the lower portion of the support body 14 in such a manner that the pick-arm is swingable or rotatable in at least the two planes respectively perpendicular to and parallel with the moving direction of the support body 14. At one end of the pick-up arm 22 is mounted a cartridge shell 26 for carrying thereon a transducer which is to face the recording medium (not shown) on the recording drive means (not shown), for picking up information recorded on the recording medium. At the other end of the pick-up arm 22 is mounted a weight 28 which is preferably adjusted so as to establish a desired gravity balance in the pick-up arm 22. A permanent magnet 30 is mounted on the upper ends of the support body 14. The magnet 30 has a flat upper surface of a magnetic pole of N or S, the opposite lower surface thereof being the opposite magnetic pole S or N. An elongated magnetic member 32 is supported by the support bock 12 so that the elongated magnetic member 32 extends in parallel with the guide rail 10 while providing a preselected length of gap between it and the magnet 30. On the elongated magnetic member 32 is wound a coil 34 which has a terminal 34a and another terminal (not shown).

The elongated magnetic member 32 and the coil 34 constitute a linear armature and the magnet 30 forms a field magnet which cooperates with the linear armature to form a linear motor. By application of a voltage across the terminals of the coil 34 to cause a current to flow through the coil 34, the magnet 30 is urged in a direction so that the support body 14 moves along the guide rail 10, whereby the support body 14 functions as a conveyer for the pick-up arm 22. As the support body 14 is thus moved along the guide rail 10, the cartridge shell 26 supported on the pick-up arm 22 moves linearly in a direction in which the stylus (not shown) attached to the cartridge shell 26 is to travel on the recording disc (not shown) rotating about an axis which is perpendicular to the direction of movement of the pick-up arm 22.

When, for example, a current flows from the terminal 34a to the other terminal and the upper surface of the magnet 30 has S type of magnetic pole, the magnet 30 is urged toward the right-hand direction in this figure. When the direction of the current through the coil 34 is reversed, the magnet 30 is urged in the left-hand direction. The magnitude of the force urging the magnet 30 is proportionate to the magnitude of the current through the coil 34, so that the speed and direction of the movement of the support body 14 can be controlled by regulating the magnitude and direction of the current through the coil 34. Accordingly, the support body 14 may be moved by an increased current through the coil 34 when a return or lead-in motion of the pick-up arm 22 is desired and be slowly moved by a decreased current when the play motion of the pick-up arm 22 is required.

In order to desirably move the conveyer means for conveying the pick-up arm 22, a displacement detector (not shown) is to be equipped on the support body 14. The displacement detector produces a voltage representative of an angular displacement of the pick-up arm 22 in the plane parallel with the guide rail 10 from a home or reference position. A control circuit (not shown) is furthermore to be provided for supplying a voltage across the terminals of he coil 34 so as to make a desired current to flow through the coil 34 until the detected displacement of the pick-up arm 22 becomes zero or lowers below a predetermined level. The control circuit thus completes a closed loop feed-back system.

It is now to be understood that an appreciable intensity of attractive force is produced between the magnet 30 and the coil 34. The attractive force is effective for compensating the total weight of the support body 14 and the pick-up arm 22, thereby to reduce frictional force generated between guide rail 10 and the roller 20. The attractive force therefore serves to reduce electric power required in the coil 34 for movement of the support body 14. The intensity of the attractive force may be desirably regulated by changing the magnitude of the magnet 30 and the length of the gap between the magnet 30 and the magnetic member or rod 32.

Being apparent from the above description, the linear tracking assembly of FIG. 1 is simple in construction and easy to control. Since, furthermore, no rotary motor is used, the linear tracking assembly of the invention is free from degradation in S/N ratio in reproduction process and is dispensed with a complicated servo mechanism and a large capacity of drive circuit for driving the motor. In addition, the linear tracking assembly of the invention may preferably include means for floating the pick-up arm by means of air pressure.

It is further to be understood that because of the compensation effect caused by the attractive force impressed on the guide rail 10 from the roller 20, a large weight of pick-up arm can be used which may usually have a rigidness large enough to avoid unwanted resonant oscillations therein.

In order to make effective the cooperation between the magnet 30 and the coil 34, the support block 12 and a support body 14 are preferably made of magnetic material and the gap between the lower end of the support body 14 and the support block 12 is small as far as possible so as to make a closed magnetic circuit in the magnet 30, the magnetic member 32, the support block 12 and the support body 14. Such closed loop of the magnetic circuit may be provided by various arrangements other than the above.

Figure 2:
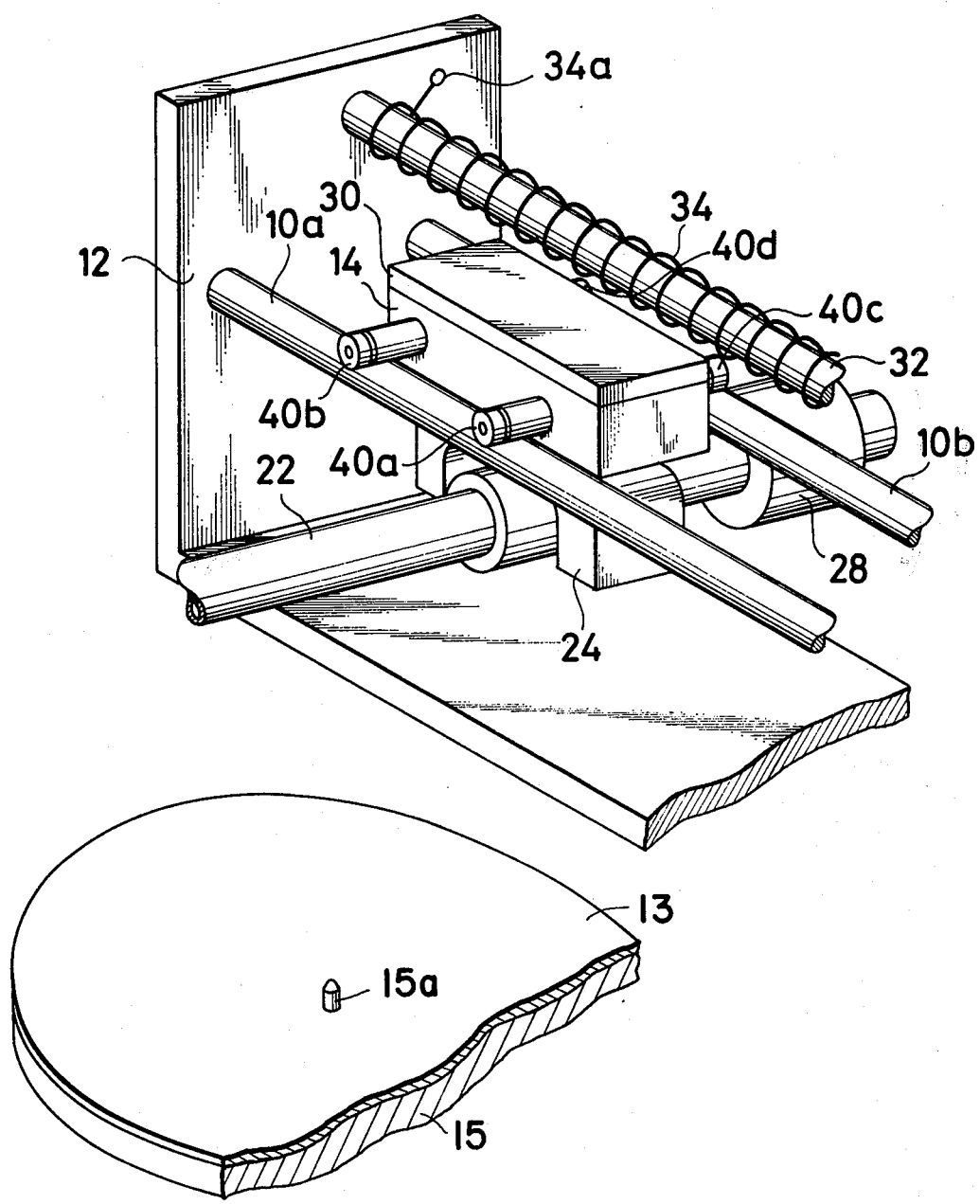
FIG. 2 is a fragmentary perspective view of another embodiment of the present invention.

In FIG. 2, there is shown another embodiment of the present invention which has the same construction as the assembly of FIG. 1 except that the support body 14 is made of a rectangular block provided with two pairs of roller assemblies 40a, 40b and 40c, 40d which are respectively rotatably mounted on the side surfaces of the support body 14. A pair of guide rails 10a and 10b are supported on the support block 12 in such a manner that they are spaced from and coextensive, preferably in parallel, with each other. The pairs of roller assemblies 40a, 40b and 40c, 40d are respectively engaged with the pair of guide rails 10a and 10b. The pick-up arm 22 is hung from the support body 14 by means of an arm holder 24 so that the pick-up arm 22 be swingable in at least the two planes perpendicular to and parallel with the moving direction the support block 14.

It is to be noted that one of the roller assemblies 40a, 40b, 40c and 40d can be omitted if desired in the present embodiment. Furthermore, the roller assembly in this embodiment may be replaced by any other types of roller assemblies, if desired.

Figure 3:
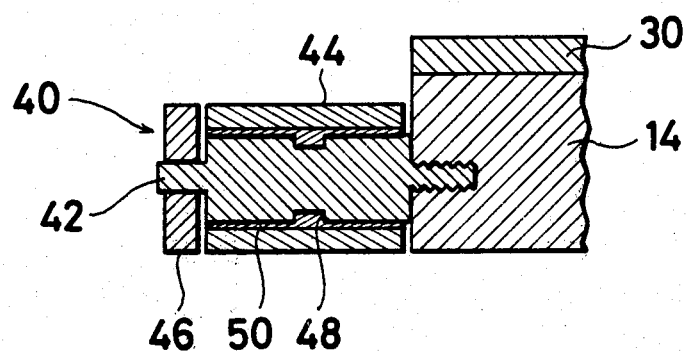
FIG. 3 is a fragmentary sectional view of the embodiment shown in FIG. 2.

A typical form of a roller assembly 40 which is desirably used for the assembly of the present invention is shown in FIG. 3, in a manner wherein the roller assembly 40 is mounted on the support body 14. The roller assembly 40 is comprised of an axis rod 42 mounted on the support body 14 by means of, for example, a thread arrangement, a roller 44 rotatably coupled with the axis rod 42 and a stop member 46. An oil sump 48 is preferably provided on the periphery of the axis rod 42 so that a viscous fluid 50 such as silicon oil can be desirably kept between the roller 44 and the rod 42 while providing desired magnitude of viscous resistance between the rod 42 and roller 44. The viscous resistance or friction provided between the roller 44 and rod 42 can provide without any other specific arrangement an adequate damping or braking effect against movement of the support body 14, so that unwanted overshoots in response of the support body 14 can be avoided. Furthermore, the magnitude of the viscous resistance can be readily changed by selecting a desired property of viscous fluid.

In addition, it is to be noted that only a selected one or more of roller assemblies may be provided with the above-mentioned viscous resistance, if preferred, with the remaining roller assemblies being free from such viscous resistance.

Furthermore, such viscous resistance may be provided with the roller assembly in the embodiment of FIG. 1.

Figure 4:
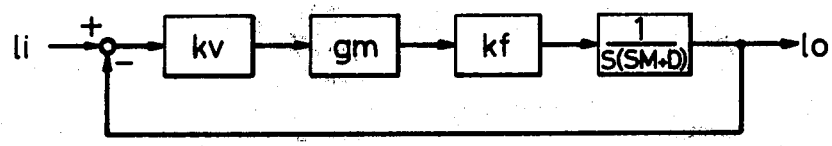
FIG. 4 is a block diagram showing a feed-back control circuit for explaining characteristics of a linear tracking arm assembly.

Referring now to FIG. 4, how the damping effect provided with the roller assemblies contributes to an improvement in response property of the overall feed-back control system for desirably controlling the linear motor assembly thereby desirably positioning the pick-up arm 22 will be explained hereinbelow.

In FIG. 4, there is shown a feed-back control circuit equivalent to such feed-back control system as described above, for controlling the linear tracking arm assemblies according to the present invention. The displacement detector produces a voltage representative of an angular displacement $li$ of the pick-up arm 22. A conversion coefficient in the conversion from the angular displacement $li$ to the voltage is represented by $Kv$. The voltage from the displacement detector is converted into a current by the control circuit, which current is supplied to the coil 34 constituting the linear motor assembly. A conversion coefficient from the voltage to the current in the control circuit is represented by gm. The linear motor assembly constituted by the coil 34 and the magnet 30 converts the current supplied thereto into a drive force which causes the conveyer means including the support body 14 to move. A conversion coefficient characteristic of the linear motor assembly is represented by $K_f$. The drive force multiplied by 1/s (sM+D) corresponds to a displacement lo of the conveyer means caused by the drive force, where s represent the Laplacian, M represents the total mass of members driven by the drive force, and D represents a viscous damping coefficient in the conveyer means and the linear motor assembly. It is now apparent that the damping coefficient D is mainly governed by the viscous resistance provided in such roller assemblies connected to the support body 14 as explained in conjunction with FIG. 3.

The loop gain lo/li of the above-mentioned feed-back control system will be expressed by:

$$\frac{lo}{li} = \frac{\frac{Kv \cdot gm \cdot Kf}{M}}{s^2 + \frac{D}{M}s + \frac{Kv \cdot gm \cdot Kf}{M}} \quad (1)$$

If, now, $$\omega n = \sqrt{\frac{Kv \cdot gm \cdot Kf}{M}}, \quad \tau = \frac{1}{2}D\sqrt{\frac{1}{M \cdot Kv \cdot gm \cdot Kf}}$$

Then, the above equation (1) will be rewritten as follows:

$$\frac{lo}{li} = \frac{\omega_n^2}{s^2 + 2\zeta\omega_n s + \omega_n^2} \quad (2)$$

As is well known in the art, such a feed-back control system as expressed by the equation (2) is of the second-order type and $\zeta$ represents a damping ratio. The loop gain expressed by lo/li takes various values in accordance with variation of the damping ratio $\zeta$. Usually, the value of the damping ratio is preferably close to a critical damping level, that is, in a range from $1/\sqrt{2}$ to 1. The above-mentioned coefficients or factors M, $K_v$, gm, $K_f$ are determined by the overall arrangement including the displacement detector, the control circuit, the linear motor assembly, for the conveyer means, and the pick-up arm 22. Therefore, the coefficient and factors M, K, $\zeta$, and $K_f$ cannot be readily changed without any significant change of mechanical design in the tracking arm assembly. However, the viscous damping coefficient D can be relatively easily changed by selecting a preferred kind of viscous fluid or by adjusting the dimension of only the roller assembly.

It is therefore apparent that the linear tracking assembly according to the present invention can be provided with a desired property.

It will be understood that the invention is not to be limited to the exact construction shown and described and that various changes and modifications may be made without departing from the spirit and scope of the invention, as defined in the appended claims.

What is claimed is:

1. A linear tracking arm assembly for linearly tracking a recording medium carrying thereon audio or video information, which assembly comprises:
   recording medium drive means for driving said recording medium in a predetermined manner;
   support and guide means fixedly positioned in conjunction with said recording medium drive means;
   conveyor means so engaged with said support and guide means as to be linearly movable in a predetermined direction with respect to said recording medium drive means;
   a pick-up arm movable with said conveyor means;
   a movable magnet mounted on said conveyor means;
   a stationary elongated magnetic member extending substantially in parallel with said predetermined direction for forming an air gap between said elongated magnetic member and said magnet; and
   a stationary coil wound on said elongated magnetic member.

2. A linear tracking arm assembly as claimed in claim 1, in which said magnet has a flat surface of a magnetic pole confronting said elongated magnetic member.

3. A linear tracking arm assembly as claimed in claim 1, in which said support and guide means comprises at least one guide rail extending substantially in parallel with said predetermined direction and in which said conveyor means includes a support body on which said magnet and said pick-up arm are mounted, and at least one roller rotatably mounted on said support body and having an axis of rotation substantially perpendicular in non-intersecting relationship to the direction of elongation of the guide rail, said support body being movable along said guide rail and said roller being rollable on said guide rail.

4. A linear tracking arm assembly as claimed in claim 1, in which said support and guide means comprises a pair of guide rails spaced apart from and coextensive with each other and extending substantially in parallel with said predetermined direction and in which said conveyor means includes a support body on which said magnet and said pick-up arm are mounted, and at least three rollers rotatably mounted on said support body and having respective axes of rotation substantially perpendicular in non-intersecting relationship to the directions of elongation of said guide rails, at least one of said rollers being rollable on one of said guide rails and the remaining rollers being rollable on the other guide rail so that said support body is movable along the guide rails.

5. A linear tracking arm assembly as claimed in claim 3, in which said guide rail has a circular cross section substantially throughout its length and in which said roller has a circumferential groove along its outer circumference and is in rollable engagement with the guide rail through said circumferential groove.

6. A linear tracking arm assembly for linearly tracking a recording medium carrying thereon audio or video information, which assembly comprises:
   recording medium drive means for driving said recording medium in a predetermined manner;
   support and guide means fixedly positioned in conjunction with said recording medium drive means, said support and guide means comprising at least one guide rail extending in a predetermined direction with respect to said recording medium drive means;
   conveyor means so engaged with said support and guide means as to be linearly movable substantially in parallel with said predetermined direction, said conveyor means including a support body and at least one roller rotatably mounted on said support body and having an axis of rotation substantially perpendicular in non-intersecting relationship to said predetermined direction so that said support body is movable along said guide rail;

a pick-up arm movable with said support body of said conveyor means;

electro-magnetic drive means for moving said conveyor means linearly along said guide rail; and viscous resistance means intervening between said support body and said roller for providing viscous resistance therebetween.

7. A linear tracking arm assembly as claimed in claim 6, in which said viscous resistance means includes a viscous fluid provided between said roller and said support body.

8. A linear tracking arm assembly as claimed in claim 7, in which said viscous fluid is silicon oil.

9. A linear tracking arm assembly as set forth in claim 7, in which said conveyor means further includes a generally cylindrical roller support member projecting from said support body in a direction perpendicular in non-intersecting relationship to said predetermined direction, said roller being rotatably mounted on said roller support member and forming between the roller and the roller support member a clearance allowing said viscous fluid to intervene therebetween.

10. A linear tracking arm assembly as set forth in claim 9, in which said roller support member is formed with a circumferential groove forming part of said clearance.

11. A linear tracking arm assembly as set forth in claim 7, in which said viscous fluid is silicon grease.

12. A linear tracking arm assembly as claimed in claim 6, in which said electro-magnetic drive means includes a magnet mounted on said conveyor means, an elongated magnetic member fixedly supported by said conveyor means and extending substantially in parallel with said predetermined direction for forming an air gap between said elongated magnetic member and said magnet, and a coil wound on said elongated magnetic member.

13. A linear tracking arm assembly for linearly tracking a recording medium carrying thereon audio or video information, which assembly comprises:

recording medium drive means for driving said recording medium in a predetermined manner;

support and guide means fixedly positioned in conjunction with said recording medium drive means, said support and guide means comprising a pair of guide rails spaced apart from and coextensive with each other and extending in a predetermined direction with respect to said recording medium drive means;

conveyor means so engaged with said support and guide means as to be linearly movable substantially in parallel with said predetermined direction, said conveyor means including a support body and at least three rollers rotatably mounted on said support body and having respective axes of rotation substantially perpendicular in non-intersecting relationship to said predetermined direction, at least one of said rollers being rollable on one of said guide rails and the remaining rollers being rollable on the other guide rail so that said support body is movable along said guide rails;

a pick-up arm movable with said support body;

electro-magnetic drive means for moving said conveyor means linearly along said guide rails; and viscous resistance means intervening between said support body and at least one of said rollers for providing viscous resistance therebetween.

14. A linear tracking arm assembly as claimed in claim 13, in which said viscous resistance means includes a viscous fluid provided between said roller and said support body.

15. A linear tracking arm assembly as claimed in claim 14, in which said viscous fluid is silicon oil.

16. A linear tracking arm assembly as set forth in claim 14, in which said viscous fluid is silicon grease.

17. A linear tracking arm assembly as claimed in claim 13, in which said electro-magnetic drive means includes a magnet mounted on said conveyor means, an elongated magnetic member fixedly supported by said conveyor means and extending substantially in parallel with said predetermined direction for forming an air gap between said elongated magnetic member and said magnet, and a coil wound on said elongated magnetic member.

* * * * *